Figure 1:
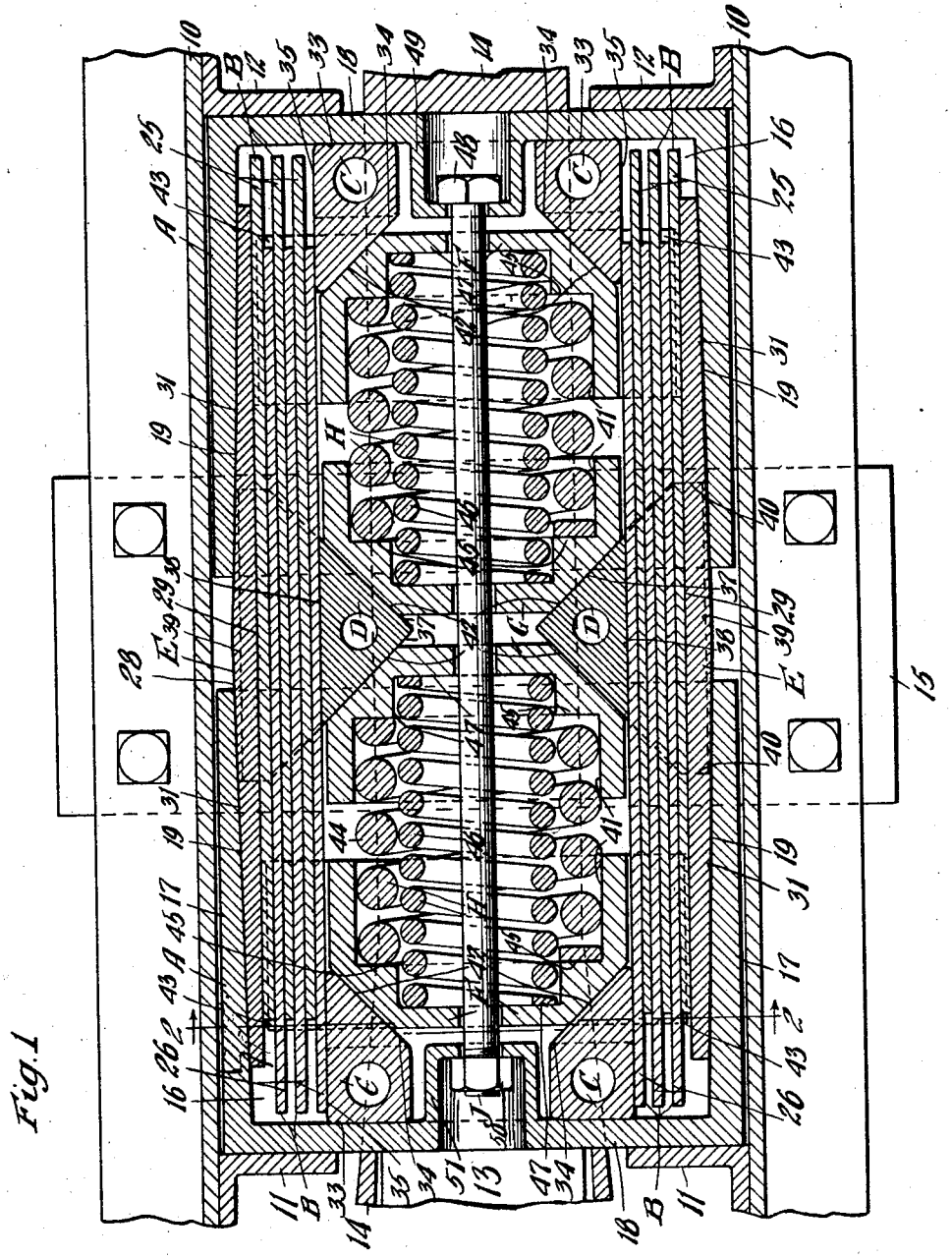

June 11, 1929. J. F. O'CONNOR 1,716,656
FRICTION SHOCK ABSORBING MECHANISM
Original Filed Feb. 8, 1923   3 Sheets-Sheet 1

Witnesses
Wm. Geiger

Inventor
John F. O'Connor
By George J. Haight Atty.

June 11, 1929.   J. F. O'CONNOR   1,716,656
FRICTION SHOCK ABSORBING MECHANISM
Original Filed Feb. 8, 1923   3 Sheets-Sheet 2
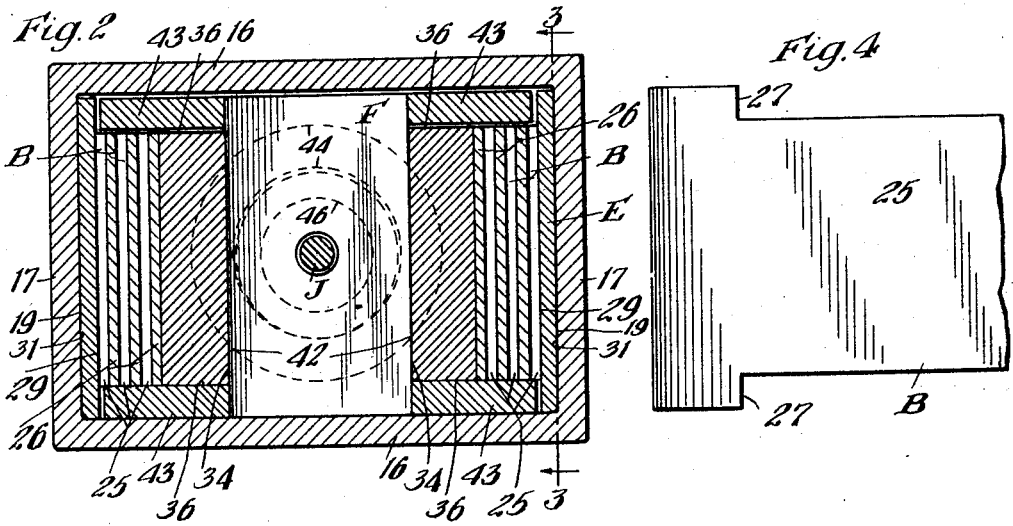
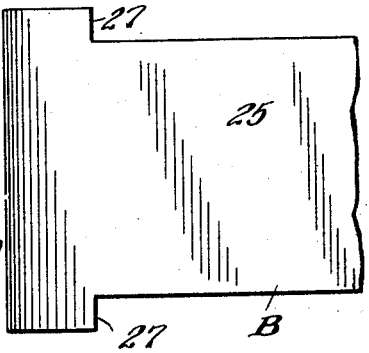
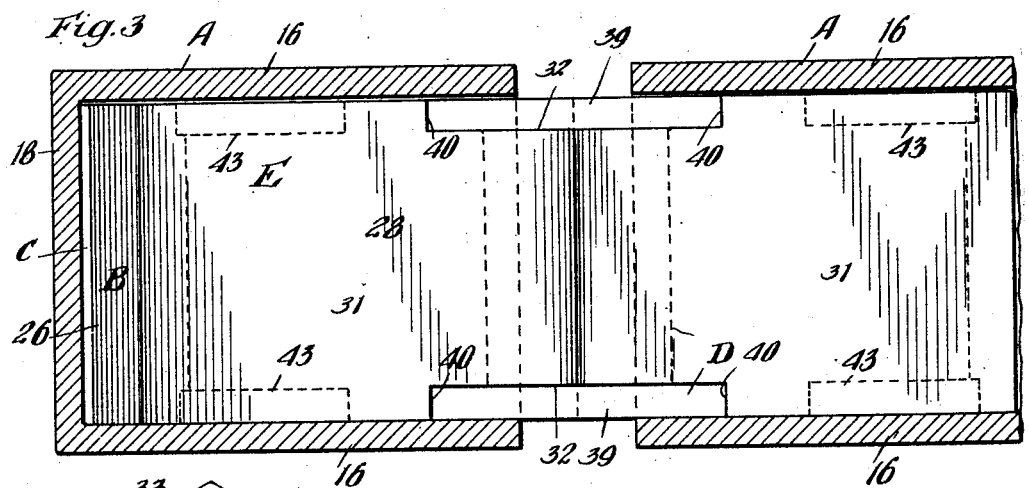
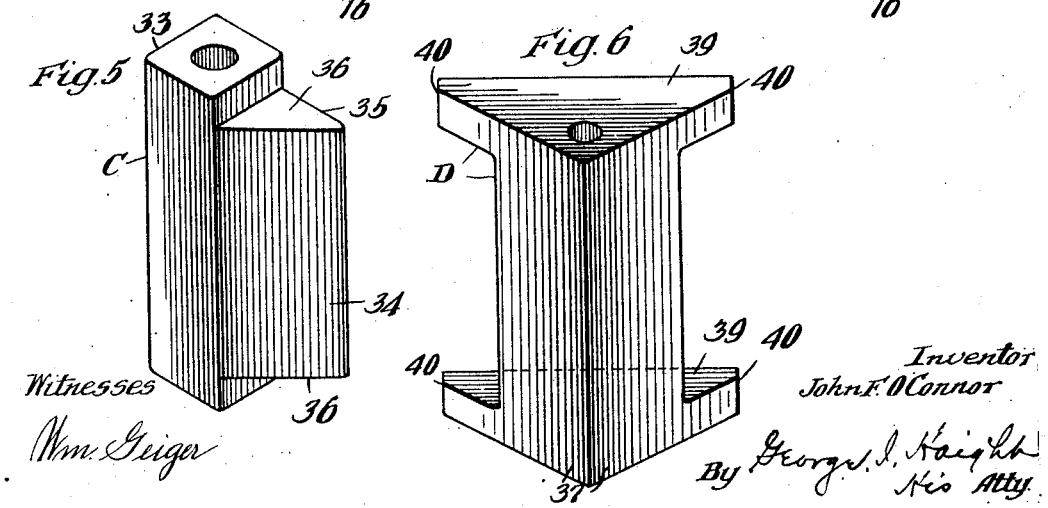
Witnesses
Wm. Geiger
Inventor
John F. O'Connor
By George I. Haight
His Atty June 11, 1929.   J. F. O'CONNOR   1,716,656
FRICTION SHOCK ABSORBING MECHANISM
Original Filed Feb. 8, 1923   3 Sheets-Sheet 3
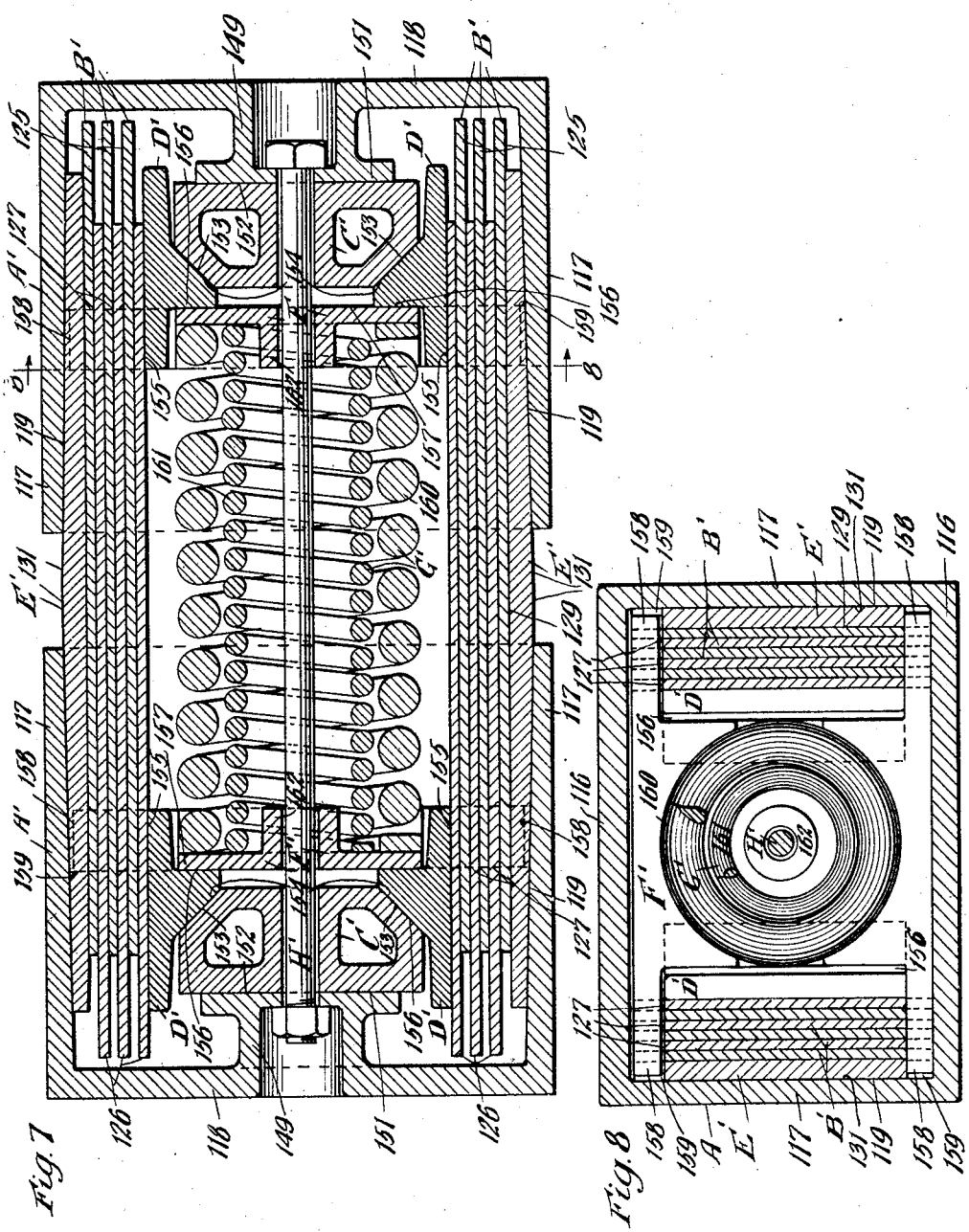
Witnesses
Wm. Geiger
Inventor
John F. O'Connor
By George J. Haight
H. Atty.

Patented June 11, 1929.

1,716,656

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed February 8, 1923, Serial No. 617,695. Renewed November 19, 1928.

My invention relates to improvements in friction shock-absorbing mechanisms.

One object of my invention is to provide a friction shock absorbing mechanism, more particularly adapted for railway draft riggings, wherein is obtained high capacity due to large frictional areas, and wherein a differential wedge action is made use of to assure quick and certain release of a plurality of friction plates.

Another object of the invention is to provide a friction shock absorbing mechanism of the type referred to, wherein a preliminary action of the followers and the wedges takes place, prior to the engagement of the ends of the friction plates by the followers, to permit easy release of the parts when the actuating pressure is removed.

A still further object of the invention is to provide a friction shock absorbing mechanism of the intercalated friction plate type, including a plurality of wedges for transmitting wedge pressure to the intercalated plates, wherein the plates are subject to transverse movement in addition to relative longitudinal movement.

Other objects of the invention will more clearly appear from the description and claims hereinafter following.

Fig. 1 is a horizontal longitudinal sectional view of a portion of a draft rigging showing my improved shock absorbing mechanism in connection therewith. Fig. 2 is a vertical transverse sectional view, corresponding substantially to the line 2—2 of Fig. 1. Fig. 3 is a vertical longitudinal sectional view corresponding substantially to the line 3—3 of Fig. 2. Fig. 4 is a detail side elevational view of one end of one of the friction plates. Figs. 5 and 6 are detail perspective views of an end and a central wedge respectively, used in connection with my improved friction draft gear. Fig. 7 is a horizontal longitudinal sectional view similar to Fig. 1, showing a modified form of the invention. And Fig. 8 is a vertical transverse sectional view corresponding substantially to the line 8—8 of Fig. 7.

In said drawings, 10—10 indicate channel shaped center or draft sills, to the inner faces of which are secured front stop lugs 11 and rear stop lugs 12. A portion of the draw-bar is shown at 13, to which is attached a hooded yoke 14. The shock absorbing mechanism proper, including front and rear follower casings, is disposed within the yoke 14 and the movable parts of the draft rigging are supported by the detachable saddle plate 15.

The embodiment of my improved friction draft gear shown in Figs. 1 to 6 inclusive, comprises, broadly, front and rear follower casings A—A; friction plates B—B; pairs of front and rear end wedges C—C; a pair of central wedges D—D; tapering friction elements E—E; an outer pair of combined wedge and spring follower caps F—F; an inner pair of combined wedge and spring follower caps G—G; tandem arranged spring resistance elements H—H; and retainer bolt J.

The follower casings A are of similar construction, each being of substantially box like shape and comprising spaced horizontally extending upper and lower walls 16—16, vertically extending spaced side walls 17—17 and end walls 18. The end wall 18 of the front and rear follower casings A coact respectively with the front stop lugs 11 and the rear stop lugs 12. The side walls 17 of each casing A are provided with interior, oppositely arranged friction surfaces 19, converging inwardly from the open end to the closed end of the casing. The casings are normally spaced apart a proper distance, so that, when the gear is fully compressed, the inner ends of the casings will abut, and the actuating force transmitted directly from one casing to the other.

The friction plates B are arranged within the casings A and comprise two oppositely arranged groups. As herein shown, the groups of plates B each comprise three plates 25 and three plates 26, the plates 25 and 26 being alternated, with a plate 25 of each group arranged outermost and in contact with the inner face of one of the tapering friction elements E. The plates 25 and 26 are of similar construction and as best shown in Fig. 4, each of the plates 25 is formed with upper and lower projections at one end thereof to provide alined upper and lower shoulders 27, for a purpose hereinafter described.

Arranged between each of the groups of friction plates B and the adjacent side walls 17 of the casings A is a tapering friction element E. As clearly shown in Figs. 1 and 3 each of the tapering friction elements E is in the form of a rectangular plate 28 provided with an inner flat friction surface 29 adapted to co-act with the outer friction surface of the outermost friction plate 25 of one of the groups of plates. The outer face of each tapering element E is oppositely inclined outwardly from the center toward the opposite ends thereof, thereby providing oppositely extending surfaces 31—31 slightly inclined with reference to the longitudinal axis of the shock absorbing mechanism. As clearly shown in Fig. 1, each of the surfaces 31 of the friction element E, co-acts with the corresponding inner friction surface 19 of one of the casings A and is arranged parallel thereto. As shown in Fig. 3 each plate E has the upper and lower edges cut away at the center thereof to provide recesses 32 for a purpose hereinafter described.

The wedges C are four in number, and are arranged at opposite ends of the shock absorbing mechanism, one pair being adapted to co-act with each follower casing. Each of the wedge blocks C is provided with an outer flat face 33, adapted to abut the inner face of the end wall 18 of the casing A, an inner wedge face 34 and a flat side face 35 adapted to engage with the innermost friction plate 26 of one of the groups of plates B. As clearly shown in Fig. 5, each of the wedge blocks C is reduced in height at the wedge end, by cutting away the upper and lower ends as indicated at 36.

The central wedge blocks D are of like construction and are arranged on opposite sides of the shock absorbing mechanism. Each of the central wedge blocks D is provided with a pair of inwardly converging wedge faces 37 adapted to co-act with the inner pair of central wedge and spring follower caps G. As clearly shown in Fig. 6, each of the wedge blocks D is of triangular shape and has the outer side thereof cut away to provide a flat bearing face 38, and spaced upper and lower flanges 39 having outer square ended portions 40, corresponding in size to the recesses 32 in the tapering friction elements E. The outer portions 40 of the upper and lower flanges 39 of the wedge blocks D are loosely received within the recesses 32 formed in the tapering friction elements E, as clearly shown in Fig. 3, thereby connecting the wedges with the elements E for relative lateral sliding movement thereto, with the flat inner face 38 of each wedge D abutting the innermost friction plate 25 of one of the groups of plates B and the flanges straddling the group of plates.

The combined wedge and spring follower caps are four in number, comprising an outer pair F—F, and an inner pair G—G. Each of the combined wedge and spring follower caps, as clearly shown in Fig. 1, is provided with a counter-sunk axial bore 41 adapted to receive one end of one of the spring resistance elements H. At the outer end each of the spring caps is provided with a pair of converging wedge faces 42, the wedge faces 42 of the outer pair of caps F being adapted to co-act with the wedge faces 34 of the wedge blocks C, and the wedge faces 42 of the inner pair of caps G being adapted to co-act with the wedge faces 37 of the central wedges D. Each of the outer combined wedge and spring follower caps F is provided with pairs of upper and lower laterally extending lugs 43, on the opposite sides thereof, adapted to engage with the shoulders 27 of the friction plates B, the lugs 43 being vertically spaced apart the proper distance to loosely receive the plates B and the reduced ends of the wedges C therebetween.

The spring resistance elements H are arranged in tandem, each co-operating with an outer and inner combined wedge and spring follower cap F and G respectively. Each of the spring resistance elements H comprises an outer, relatively heavy, coiled spring 44 adapted to abut the shoulders 45 formed by the counter bore 47 of the caps F and G, and an inner, relatively lighter, coiled spring 46 received in the counter bored portions 47 and adapted to abut the end walls of the combined wedge and spring follower caps F and G.

The shock absorbing mechanism is held under initial compression by the retainer bolt J passing through the inner springs 46 and alined recesses in the combined wedges and spring follower caps F and G, having one end thereof anchored to the rear follower casing A by means of the head 48 received within the hollow boss 49 projecting inwardly from the wall 18 of the rear casing A and having the other end thereof anchored to the front follower casing A by means of the nut 50 received within the hollow boss 51 projecting inwardly from the end wall 18 of the front follower casing A.

When the parts are in normal position as clearly shown in Fig. 1, the outer combined wedges and spring caps F have the wedge faces thereof in engagement with the wedge faces of the wedge blocks C and are held in their extreme outer position by the expansive force of the spring resistance elements H, with the lugs 43 in engagement with the shoulders 27 of the friction plates B. As shown in Fig. 1 the friction plates 25 and 26 are alternated and reversely arranged with the shoulders 27 of the friction plates 25 engaging the lugs 43 of the combined wedge and spring follower cap F at the front end of the gear and the shoulders 27 of the plates 26 engaging the lugs 43 of the combined wedge and spring follower cap F at the rear end of the gear, thereby holding the opposite ends of each set of plates 25 and 26 slightly spaced from the adjacent end wall 18 of the corresponding follower casing A.

In the operation of my improved shock absorbing mechanism, assuming that the front follower A is being moved rearwardly toward the rear follower during buff, a wedge action will be set up between the wedges C and the combined wedge and spring follower caps F, and between the central wedges D and the combined wedge and spring follower caps G, effecting a corresponding compression of the spring resistance elements H, whereupon the outer faces of the wedges C and D will be forced into tight engagement with the groups of friction plates B, thereby putting the friction plates and the tapering friction elements E under pressure, and augmenting the frictional resistance between the same. During the initial inward movement of the follower A, due to the wedging action between the faces 19 of the front follower casing and the faces 31 of the tapering friction elements E and the wedging action between the inner combined wedge and spring cap followers G and the central wedges D—D, which are connected to the tapering wedge friction elements E by the laterally projecting lugs 39, there will be a tendency for the tapering friction elements E to move rearwardly with the front follower A. As there is a corresponding wedging action between the inner walls of the rear follower A and the tapering friction elements E, and between the central wedges D and the combined wedge and spring follower cap G associated with the rear follower casing, there will be a balancing tendency to prevent rearward movement of the tapering friction elements E—E. Due to this balancing of frictional resistance tending to move the tapering frictional elements rearwardly and tending to oppose movement of the same, the latter will be moved rearwardly a distance equal to one-half the movement of the outer follower casing A. During this movement of the tapering friction elements E, there will be an equal bodily rearward movement of the friction plates B due to the clamping action of the wedges C, D and the friction elements E, thereby maintaining the spacing between the ends of the two sets of plates and the end walls of the follower casings A constantly substantially equal as the followers approach the ends of the plates. During this inward movement of the front follower A the lugs 43 on the caps F and the shoulders 27 on the plates B will be moved out of contact and the end walls 18 of the follower casings will gradually approach the ends of the respective sets of friction plates 25 and 26, until the same are engaged thereby and are moved therewith. Upon further movement of the front follower the friction plates 25 will be moved therewith, relatively to friction plates 26 opposed by the frictional resistance therebetween due to the wedging action of the mechanism. During the described operation of the mechanism, a differential wedge action will be set up. Due to the wedging action between the outwardly converging faces of the tapering friction elements E, there is effected a lateral inward bodily movement of the groups of friction plates B and a corresponding inward movement toward the axis of the gear of the wedges C and D causing the wedge faces thereof to move inwardly on the wedge faces of the combined wedge and spring caps F and G, effecting an additional compression of the spring resistance elements H.

During the draft action of the shock absorbing mechanism, the operation is similar to that just described, the only difference being that the rear follower A is moved relatively to the front follower A.

Upon removing the pressure on the shock absorbing mechanism, the front and rear sets of wedge blocks C, together with the respective followers A, will be caused to move apart first by the expansion of the springs H, thus causing the release of the wedge mechanism and an immediate decrease of the pressure on the friction plates, prior to any relative movement of the friction plates with reference to each other and with reference to the elements E. During the outward movement of the wedges C and the combined wedge and spring follower caps F, the lugs 43 on the latter will approach the shoulders 27 of the friction plates B, finally engaging therewith and restoring the friction plates to their original position with the free ends thereof slightly spaced from the inner faces of the walls 18 of the front and rear follower casings. The expansive action of the springs will also effect the centering of the tapered friction elements E through the action of the combined wedge and spring follower caps G and the central wedges D.

The modification shown in Figs. 7 and 8 comprises, broadly, front and rear follower casings A'—A'; friction plates B'—B'; front and rear wedge blocks C'—C'; front and rear pairs of friction wedge shoes D'—D'; tapering friction elements E'—E'; front and rear spring followers F'—F'; spring resistance G' and retaining bolt H'.

In the modified form shown in Figs. 7 and 8, the front and rear follower casings A'—A' are of substantially the same construction as the follower casings A—A of the preferred embodiment, having horizontal top and bottom walls 116, vertical side walls 117, end walls 118 and inner opposed friction surfaces 119 converging inwardly from the open end of each casing toward the end wall 118 thereof. Each of the casings A' is also provided with an inwardly projecting hollow boss 149 on the end wall thereof. The boss 149 of each casing is provided with an inner flat face 151 adapted to form an abutment for the corresponding wedge block C'.

The friction plates B' are of the same construction as the friction plates B of the preferred embodiment of the invention, and are arranged in two groups, each group comprising two sets of plates 125 and 126 respectively, similarly arranged to the plates 25 and 26 of the preferred form of the invention.

The tapering friction elements E' are interposed between the groups of friction plates and the inner friction surfaces 119 of the front and rear follower casings A'. Each of the tapering friction elements E' is provided with a flat inner friction face 129 adapted to co-act with the outer face of the outermost friction plate 126 of one of said groups, and a pair of outer friction faces 131 adapted to co-act with the inner friction surfaces 119 of the front and rear follower casings respectively. The outer friction surfaces 131 of the tapering friction elements E' are inclined to the axis of the gear similarly to the corresponding friction surfaces 31 of the friction elements E of the preferred form of the invention, each extending parallel to the corresponding friction surface 119 of one of the casings A'.

The wedge blocks C' are of like construction, each being provided with a flat face 152 adapted to abut the face 151 of one of the bosses 149, and a pair of inner wedge faces 153 adapted to co-act with a pair of friction wedge shoes D'.

The friction wedge shoes D' are four in number, arranged in pairs, at the opposite ends of the shock absorbing mechanism, each pair co-acting with the corresponding wedge block C'. Each of the friction wedge shoes D' is provided with a wedge face 154 adapted to co-act with one of the wedge faces 153 of one of the wedge blocks C', an outer elongated flat friction face 155 adapted to co-act with the innermost friction plate 126 of one of the groups of plates B, and a flat rear face 156 forming an abutment for the spring follower F'. As clearly shown in Fig. 7, each of the wedge friction shoes C' is in the form of an elongated member provided with a laterally projecting central portion forming the wedge member proper which is provided with the wedge face 154 and the follower abutment face 156.

The front and rear spring followers F'—F' are of like construction, each being in the form of a rectangular plate 157. Each of the spring followers F' is provided with upper and lower lugs 158 extending oppositely from the rectangular plate portion 157 in a direction lateral to the axis of the gear. The upper and lower lugs 158 are spaced apart vertically a proper distance to loosely receive therebetween the groups of friction plates, the elongated inner ends of the friction wedge shoes D' and the tapering friction elements E'. The lugs 158 serve as a means for restoring the groups of friction plates B' and the tapered friction elements E' to normal position, the ends thereof engaging with shoulders 159 formed at the opposite ends of each of the tapered friction elements E' and shoulders 127 on the friction plates 125 and 126, similar to the shoulders 27 of the preferred form.

The spring resistance G' comprises a relatively heavy, outer coiled spring 160 and a relatively lighter, inner coiled spring 161. The springs 160 and 161 are interposed between the spring followers F', the inner coiled spring 161 being held in centered position by the inwardly projecting bosses 162 on the respective spring followers F'.

The mechanism is held under initial compression by the retainer bolt H' anchored within the hollow bosses of the front and rear follower casings A' and extending through the inner coiled spring 161 and alined recesses in the front and rear spring followers F' and the front and rear wedge blocks C'.

In the operation of the modified form of the mechanism as shown in Figs. 7 and 8, assuming that the front follower A' is being moved toward the rear follower A' during buff, a wedge action will be set up between the wedges C' and the wedge shoes D' causing pressure to be applied to the groups of friction plates at the opposite sides of the mechanism. During the first part of the movement of the follower casing A', the wedge friction shoes D' will slide on the inner friction plates of each group of friction plates B' until the free ends of the friction plates are picked up by the follower and move therewith in a manner similar to that described in connection with the preferred form of the invention. During the inward movement of the follower casing A', a wedging action will also be set up between the inner friction surfaces of the casings A' and the tapering friction elements E' thereby effecting bodily lateral movement of the groups of friction plates and the friction shoes D'. The lateral movement of the wedge faces 154 of the shoes, on the wedge faces 153 of the wedge blocks C', effects a further compression of the spring resistance G'. Upon removing the pressure from the shock absorbing mechanism, the wedge locks C' and shoes D' together with the followers will be caused to move outwardly first, by the expansion of the springs 160 and 161, thus causing a prompt release of the wedging mechanism and an immediate decrease of the pressure on the friction plates prior to any relative movement of the plates with reference to each other and with reference to the friction elements E'. As the spring followers move outwardly with the wedge friction shoes, the lugs 158 thereon will engage with the shoulders on the friction plates, thereby restoring the same to normal position with the free ends thereof slightly spaced from the end walls 118 of the corresponding follower casings A'.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with oppositely arranged, hollow, front and rear follower casings provided respectively with forwardly and rearwardly converging friction surfaces on the interior thereof, said casings being normally spaced apart and adapted to move relatively to each other; of a longitudinally arranged, wedge-actuated, lateral pressure creating means interposed between said followers; main spring resistance means; longitudinally arranged friction plates adapted for relative movement upon relative movement of the follower casings, said plates being divided into two groups on opposite sides of said wedge pressure creating means; and friction means interposed between each group of plates and adjacent friction surfaces of said casings.

2. In a friction shock absorbing mechanism, the combination with oppositely arranged, hollow, front and rear follower casings, provided with interior friction surfaces converging toward the opposite ends of the mechanism; of a longitudinally arranged, wedge pressure creating means co-acting with said follower casings; main spring resistance means; longitudinally arranged, co-acting friction plates adapted to be moved relatively upon relative movement of the follower casings, said plates being divided into two groups on opposite sides of said wedge pressure creating means; and an oppositely tapering friction plate interposed between each group of plates and the adjacent friction surfaces of said casings.

3. In a friction shock absorbing mechanism, the combination with front and rear follower elements, each provided with oppositely disposed, longitudinally extending, friction surfaces, said surfaces being inclined with reference to the longitudinal axis of the mechanism; of wedge pressure creating means interposed between said followers; main spring resistance means; longitudinally arranged friction plates adapted for relative movement upon relative movement of said followers, said plates being divided into two groups on opposite sides of said wedge pressure creating means; and longitudinally arranged, oppositely tapering, elements interposed between each group of plates and adjacent friction surfaces of the followers.

4. In a friction shock absorbing mechanism, the combination with a plurality of groups of intercalated friction plates; of a wedge pressure creating means interposed between said groups of plates; main spring resistance means; a tapering friction element co-acting with each group of plates; and front and rear followers co-operating with said wedge pressure creating means, and adapted to move said friction plates relatively to each other, each of said followers being provided with longitudinally arranged friction surfaces inclined with reference to the axis of the mechanism and co-acting with said tapering friction elements.

5. In a friction shock absorbing mechanism, the combination with a plurality of sets of relatively movable intercalated friction plates, divided into two groups; of a front follower casing co-acting with one set of plates and provided with forwardly converging friction surfaces on the interior thereof; a rear follower casing co-acting with the other set of plates and provided with rearwardly converging friction surfaces on the interior thereof; a friction element interposed between each group of plates and the adjacent friction surfaces of said followers, said element being provided with oppositely extending friction surfaces, one of said surfaces being arranged parallel to and co-acting with one of the friction surfaces on the front follower, and the other of said surfaces being arranged parallel to and co-acting with one of the friction surfaces of said rear follower; a wedge pressure creating means interposed between said groups of plates and adapted to be actuated by the relative movement of the follower casings; and spring resistance means cooperating with said wedge pressure creating means.

6. In a friction shock absorbing mechanism, the combination with front and rear follower casings provided with oppositely arranged interior friction surfaces; of a longitudinally arranged wedge pressure creating means interposed between said followers and adapted to be actuated thereby; spring resistance means cooperating with said wedge pressure creating means; longitudinally arranged friction plates adapted for relative movement upon relative movement of the follower casings, said plates being divided into two groups on opposite sides of said wedge pressure creating means; and a tapered friction element interposed between each group of plates and the adjacent friction surfaces of said follower casings, and provided with friction surfaces co-operating with said adjacent friction surfaces of the front and rear follower casings.

7. In a friction shock absorbing mechanism, the combination with oppositely arranged, front and rear, follower casings provided with interior inclined friction surfaces, said casings being normally spaced apart and adapted to move relatively; of wedge blocks movable with said follower casings; wedge elements co-operating with said wedge blocks; spring resistance co-operating with said wedge blocks; longitudinally arranged friction plates adapted for relative movement upon relative movement of the follower casings, said plates being divided into two groups on opposite sides of said wedge pressure creating means, each group comprising two sets of plates; means arranged to engage each plate near one end thereof for restoring each set of plates to normal position with the opposite ends thereof slightly spaced from the adjacent follower; and a friction element having inclined friction surfaces interposed between each group of plates and the adjacent friction surfaces of said follower casings and having the inclined surfaces thereof co-operating with said inclined friction surfaces of the casings.

8. In a friction shock absorbing mechanism, the combination with oppositely arranged, front and rear, follower casings provided with interior friction surfaces, said casings being normally spaced apart and adapted to move relatively; of lateral wedge pressure creating means co-operating with said followers; longitudinally arranged friction plates adapted for relative movement upon relative movement of the follower casings, said plates being divided into two groups on opposite sides of said wedge pressure creating means, each group comprising two sets of plates; a tapering friction element interposed between each group of plates and the adjacent friction surfaces of said casings; means arranged to engage corresponding ends of the friction plates of each set for restoring the same to normal position; and co-acting means on said restoring means and plates for normally spacing the ends of said plates from the end walls of the respective follower casing to permit preliminary action of said followers and wedge pressure creating means prior to engagement of the followers with the friction plates to actuate the latter.

9. In a friction shock absorbing mechanism, the combination with front and rear, relatively movable followers provided with longitudinally arranged friction surfaces; of longitudinally arranged friction plates adapted for relative movement upon relative movement of said followers, said plates being divided into two groups, each group comprising two sets of plates; a tapering friction element interposed between each group of plates and the adjacent friction surfaces of said followers; and lateral wedge pressure creating means interposed between said two groups of plates and co-operating with said followers, said means including wedge elements, spring resistance means and spring followers, said spring followers being provided with means rigid therewith for engaging corresponding ends of the friction plates of each set for returning the same to normal position; said means including cooperating abutments on said plates and rigid means for normally slightly spacing the engaged ends of the plates of each set from the adjacent followers to permit preliminary action of said followers and wedge pressure creating means prior to engagement of the followers with the friction plates to actuate the latter.

10. In a friction shock absorbing mechanism, the combination with a plurality of sets of relatively movable intercalated friction plates, divided into two groups; of a front follower casing co-acting with one set of plates, said casing being provided with longitudinally arranged interior friction surfaces; a rear follower casing co-acting with the other set of plates, said casing being provided with longitudinally arranged interior frictional surfaces; a friction element interposed between each group of plates and the adjacent friction faces of said followers; and a lateral pressure creating means interposed between said groups of plates, said lateral pressure creating means including wedge blocks movable with said followers, central wedges having flat faces engaging the inner sides of the groups of plates, additional wedges co-acting with said first named wedges and said central wedges, and tandem arranged springs co-acting with said additional wedges.

11. In a friction shock absorbing mechanism, the combination with a plurality of sets of relatively movable intercalated friction plates, divided into two groups; of a front follower casing co-acting with one set of plates, said casing being provided with longitudinally arranged interior friction surfaces; a rear follower casing co-acting with the other set of plates, said casing being provided with longitudinally arranged interior friction surfaces; a friction element interposed between each group of plates and the adjacent friction surface of said followers; and a lateral pressure creating means interposed between said groups of plates, said lateral pressure creating means including wedges movable with said followers, a central wedge anchored to each friction element and provided with a flat face engaging the inner side of the adjacent group of friction plates, additional wedges co-acting with said first named wedges and said central wedges and tandem arranged springs co-acting with said additional wedges.

12. In a friction shock absorbing mechanism, the combination with a plurality of sets of relatively movable intercalated friction plates, divided into two groups, of a front follower casing co-acting with one set of plates, said casing being provided with longitudinally arranged interior friction surfaces; a rear follower casing co-acting with the other set of plates, said casing being provided with longitudinally arranged interior friction surfaces; a friction element interposed between each group of plates and the adjacent friction surfaces of said followers; a pair of wedge blocks movable with each follower, each of said wedge blocks having a flat face co-acting with the inner side of one of said groups of friction plates; a pair of central wedges each having a pair of wedge faces and a flat face, said flat face co-acting with one of said groups of friction plates; a pair of combined wedge and spring followers co-acting with said central wedges; a combined wedge and spring follower co-acting with each pair of wedge blocks; and a spring resistance co-acting with said combined wedges and spring followers.

13. In a friction shock absorbing mechanism, the combination with oppositely arranged, front and rear, follower casings provided with interior friction surfaces, said casings being normally spaced apart and adapted to move relatively; of a wedge pressure creating means interposed between said follower casings, said means including wedge blocks co-acting with the front and rear follower casings respectively, tandem arranged springs, central wedges between the adjacent ends of said springs, a combined wedge and spring follower interposed between the central wedges and the adjacent end of each spring, an outer combined wedge and spring follower interposed between the springs and wedge blocks coacting with the front follower, and an outer combined wedge spring follower interposed between the springs and the wedge blocks co-acting with the rear follower; longitudinally arranged sets of friction plates adapted for relative movement upon relative movement of said follower casings, said plates being arranged in two groups on opposite sides of said wedge pressure creating means; a friction element interposed between each group of friction plates and the adjacent friction surfaces of said follower casings; and interengaging means on corresponding ends of one set of friction plates and one of said outer combined wedges and spring followers, and on corresponding ends of the other of said sets of friction plates and the other outer combined wedge and spring follower for restoring the friction plates to normal position.

14. In a friction shock absorbing mechanism, the combination with front and rear follower members adapted to move relatively toward and from each other; of a group of longitudinally extending intercalated friction plates interposed between said follower members and adapted to be shifted longitudinally relatively to each other upon relative approach of said follower members, said group of plates being responsive to laterally applied pressure; and means for compressing said groups of plates laterally, said means being operative upon relative approach of said follower members, said means including a spring resistance, and means operative upon relative approach of said follower members, to shift said group of plates bodily transverse to the line of relative approach of said follower members.

15. In a shock absorbing mechanism, the combination with front and rear follower members adapted to move toward and from each other; two, laterally separated, groups of longitudinally extending, intercalated friction plates adapted for relative longitudinal movement upon relative approach of said follower members, said plates being responsive to laterally applied pressure thereon; and means for compressing said groups of plates laterally upon relative approach of the follower members and including a longitudinally arranged spring resistance located between the groups of plates, and means operative to shift the two groups of plates bodily transverse to the line of relative approach of the follower members when the latter are moved relatively toward each other.

16. In a friction shock absorbing mechanism, the combination with a plurality of intercalated, relatively movable, longitudinally disposed group of friction plates; means for placing said plates under lateral pressure, including wedge friction shoes at the opposite ends of said plates and engaging said group of plates on one side thereof, spring resistance means opposing relative movement of the shoes at the opposite ends of the plates, spring followers co-operating with said spring resistance and shoes, said followers having means thereon engaging said plates for returning them to normal position, relatively movable main followers having engagement with said shoes for effecting longitudinal movement of the latter, and lateral movement resisting means movable with said main followers disposed on the other side of said group of plates and having laterally acting inclined faces.

17. In a draft gear, in combination, a pair of chambered followers, the side walls of each being tapered, a set of centrally disposed wedging elements in each follower, intercalating plates at each side of the wedging elements, means including members engaging said wedging elements for creating lateral pressure on said plates during compression of said gear, and a tapered plate interposed between the plates and the side walls of both followers.

18. In a draft gear, a pair of followers having inclined inner side walls, intercalated friction plates including a plate having corresponding inclined surfaces for engaging the inclined surfaces of said followers, and means for creating lateral pressure on said plates and for causing relative movement of the same during the compression of said gear.

In witness that I claim the foregoing I have hereunto subscribed my name this 2nd day of February, 1923.

JOHN F. O'CONNOR.